US008411589B2

(12) United States Patent
Ikeda

(10) Patent No.: US 8,411,589 B2
(45) Date of Patent: Apr. 2, 2013

(54) COMMUNICATION SYSTEM, INFORMATION PROCESSING APPARATUS, AND CONTROL METHOD

(75) Inventor: Nobuhiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 335 days.

(21) Appl. No.: 12/811,947

(22) PCT Filed: Mar. 4, 2009

(86) PCT No.: PCT/JP2009/054597
§ 371 (c)(1),
(2), (4) Date: Jul. 7, 2010

(87) PCT Pub. No.: WO2009/119311
PCT Pub. Date: Oct. 1, 2009

(65) Prior Publication Data
US 2010/0278075 A1 Nov. 4, 2010

(30) Foreign Application Priority Data

Mar. 27, 2008 (JP) ................................. 2008-084099

(51) Int. Cl.
*H04L 12/28* (2006.01)

(52) U.S. Cl. .......................... 370/254; 370/255; 370/389

(58) Field of Classification Search .................. None
See application file for complete search history.

(56) References Cited

U.S. PATENT DOCUMENTS

| 7,827,243 B2* | 11/2010 | Lee et al. ....................... 709/205 |
| 7,881,223 B2* | 2/2011 | Shim et al. .................... 370/254 |
| 7,940,760 B2* | 5/2011 | Park et al. ..................... 370/389 |
| 8,121,052 B2* | 2/2012 | Zheng et al. ................... 370/254 |
| 2002/0044549 A1 | 4/2002 | Johansson et al. ............ 370/386 |
| 2003/0179742 A1 | 9/2003 | Ogier et al. .................... 370/351 |
| 2006/0039298 A1 | 2/2006 | Zuniga et al. .................. 370/252 |
| 2010/0278075 A1* | 11/2010 | Ikeda ............................ 370/254 |

FOREIGN PATENT DOCUMENTS

| EP | 1 389 853 | 2/2004 |
| JP | 10-135965 | 5/1998 |

* cited by examiner

*Primary Examiner* — Robert Wilson
(74) *Attorney, Agent, or Firm* — Fitzpatrick, Cella, Harper & Scinto

(57) ABSTRACT

The invention makes it possible to manage the wireless resources of each network even if network separation, disappearance, and recreation are repeated. The invention includes a management apparatus (104) which communicates with an AP (101) in the first network. The management apparatus (104) includes a reception unit which receives a message (M502) from some (111) of the communication apparatuses when some (111, 112) of a plurality of communication apparatuses form the second network, a management unit which manages information for forming the second network, and information on a network with which some (111, 112) of the communication apparatuses that have belonged to the second network should associate, and a transmission unit which transmits messages (M503, M505) containing the information for forming the second network to some (111, 112) of the communication apparatuses when the message (M502) is received.

9 Claims, 16 Drawing Sheets

F I G. 11

| ESSID | WIRELESS COMMUNICATION APPARATUS |
|---|---|
| GP1 | (101), 102, 103, 104 |
| GP2 | (111), 112 |
| GP3 | 121, (122) |

F I G. 16

| ESSID | WIRELESS COMMUNICATION APPARATUS |
|---|---|
| GP1 | (101), 102, 103, 104, 122 |
| GP2 | (111), 112, 121 |

COMMUNICATION SYSTEM, INFORMATION PROCESSING APPARATUS, AND CONTROL METHOD

TECHNICAL FIELD

The present invention relates to a communication control technique in a network.

BACKGROUND ART

In recent years, devices which execute wireless communication on the basis of the IEEE standards (IEEE Std 802.11-1999 (R2003)) for wireless LANs have widely prevailed.

In general, the communication modes of wireless LANs can be broadly classified into an infrastructure mode and an ad hoc mode. The former is a communication mode in which there exists a plurality of wireless communication apparatuses having a station (STA) function and a wireless communication apparatus having an access point (AP) function. The latter is a communication mode in which there exists a plurality of wireless communication apparatuses having the STA function and the apparatuses directly communicate with each other without the intervention of a wireless communication apparatus having the AP function.

In either of the communication modes, it is possible to recreate an original network after a formed network is separated and the separated network disappears.

If, for example, it is required to execute communication while reserving a band, a communication apparatus having both the AP and STA functions can transit to an AP mode, and form a new network with a communication apparatus having the STA function (network separation). Furthermore, after the desired communication ends, the communication apparatus can reconnect to an original network (network disappearance and recreation).

Japanese Patent Laid-Open No. 10-135965 discloses a wireless communication scheme which integrates two different networks into one network in the ad hoc mode. According to this patent reference, by providing a communication means for determining channel settings for each host in the two networks, it is possible to recreate one integrated network from the two different networks after selecting an appropriate channel.

However, as the reconfiguration of the network topology is repeated by network separation, disappearance, and recreation as described above, it becomes difficult to manage the resources of the networks, such as channels and bands.

DISCLOSURE OF INVENTION

The present invention has been made in consideration of the aforementioned problems, and has as its object to make it possible to manage the resources of networks even when the separation, disappearance, and recreation of the networks are repeated.

In order to achieve the above object, for example, an information processing apparatus according to the present invention has the following arrangement. That is, an information processing apparatus characterized by comprising: a first reception unit configured to receive a message indicating formation of a second network from a first subset of communication apparatuses leaving a first network; a management unit configured to manage information for the second network and information for a third network, wherein the third network is a network to be connected by the first subset of communication apparatuses in response to the second network disappearing; and a first transmission unit configured to transmit, when the message is received by said first reception unit, at least the information for the second network or the information for the third network to the first subset of communication apparatuses.

According to the present invention, it is possible to manage the resources of networks even when the separation, disappearance, and recreation of the networks are repeated.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 11 is a table showing the details of a group management table stored in the storage area of a management apparatus 104;

FIG. 16 is a table showing the details of a group management table stored in the storage area of the management apparatus 104.

BEST MODE FOR CARRYING OUT THE INVENTION

Preferred embodiments of the present invention will be explained below with reference to the accompanying drawings.

In the first embodiment, a case will be described in which a management apparatus notifies communication apparatuses of the resources for separation and those for recreation when a network is separated, thereby managing the resources.

In the second embodiment, a case will be explained in which a management apparatus notifies communication apparatuses of the resources for separation when a network is separated, and notifies the communication apparatuses of the resources for recreation when the separated network disappears, thereby managing the resources.

Note that in a description of each embodiment, a term "network separation" means that some of the communication apparatuses forming a network leave the network, and newly form another network.

A term "network disappearance" means that all communication apparatuses forming a network leave the network, or an access point within the network halts its function.

A term "a next associate network" indicates a network which communication apparatuses that have formed a separated network associate with (join) next after the separated network disappears.

A term "network recreation" means that the communication apparatuses which have formed the disappeared network connect to a next associate network.

A group indicates a group of communication apparatuses forming a network among communication apparatuses belonging to a communication system. This group includes a communication apparatus having an AP function and communication apparatuses having an STA function.

A communication apparatus which has the STA function and belongs to a group is a communication apparatus which associates with an AP belonging to the group. Changing a group means changing a group to which a communication apparatus belongs to another group.

Furthermore, a control area is the wireless communicable range of an AP. The embodiments will be described in detail below using the above terms.

<1. Network Configuration of Communication System>

Figure 1:
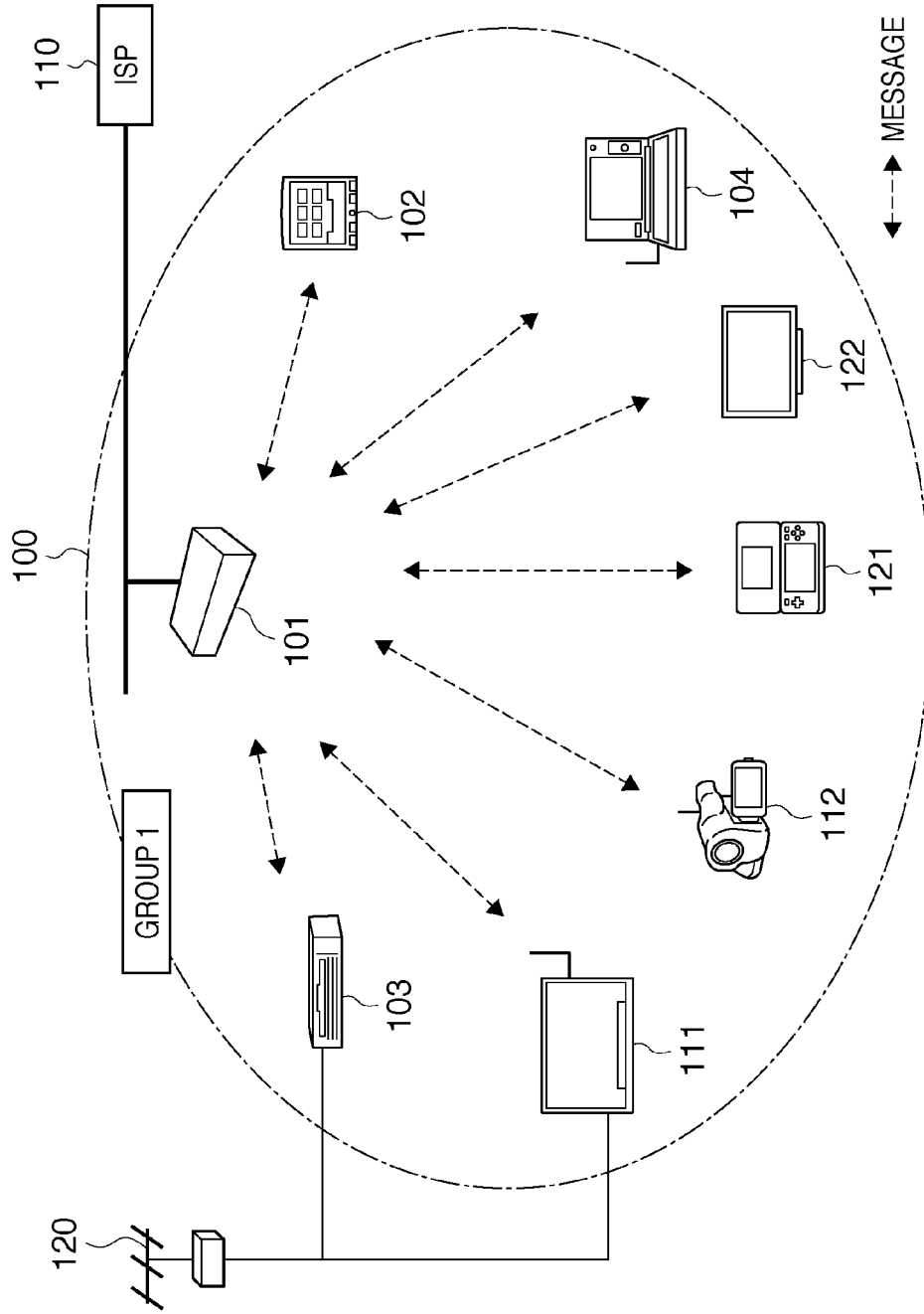
FIG. 1 is a view showing the network configuration of a communication system which includes a management apparatus (information processing apparatus) according to the first embodiment of the present invention.

FIG. 1 is a view showing the network configuration of a communication system which includes a management apparatus (information processing apparatus) according to the first embodiment of the present invention.

Referring to FIG. 1, reference numeral 110 denotes an ISP (Internet Service Provider); and 101, a wireless LAN access point apparatus which is connected to the ISP 110, and has a router function.

Reference numeral 100 denotes a control area of the access point apparatus 101. In the control area, communication apparatuses (102 to 104, 111, 112, 121, and 122) are associated with the access point apparatus 101 so that messages can be communicated via channel 7. Consequently, the first network (to be referred to as network 1 hereinafter) is formed. A group forming network 1 is referred to as group 1.

Among the communication apparatuses belonging to group 1, the communication apparatus 102 is a PDA (Personal Digital Assistant) apparatus having a built-in input/output device.

The communication apparatus 103 is a tuner apparatus. The communication apparatus 104 is a management apparatus. The management apparatus 104 manages the communication resources of the plurality of communication apparatuses associated with the access point apparatus 101, and also manages groups each of which forms a network in accordance with network separation, disappearance, and recreation.

The communication apparatus 111 is a large display device having an access point function. The communication apparatus 112 is a digital video camera (DVC). Reference numeral 120 denotes a broadcast receiving antenna which transmits a received broadcast signal to the tuner apparatus 103 and the display device 111 via a branching filter.

The communication apparatus 121 is a terminal apparatus having a game function. The communication apparatus 122 is a small display device having the access point function.

<2. Flow of Messages Transmitted/Received When Network is Separated>

Figure 2:
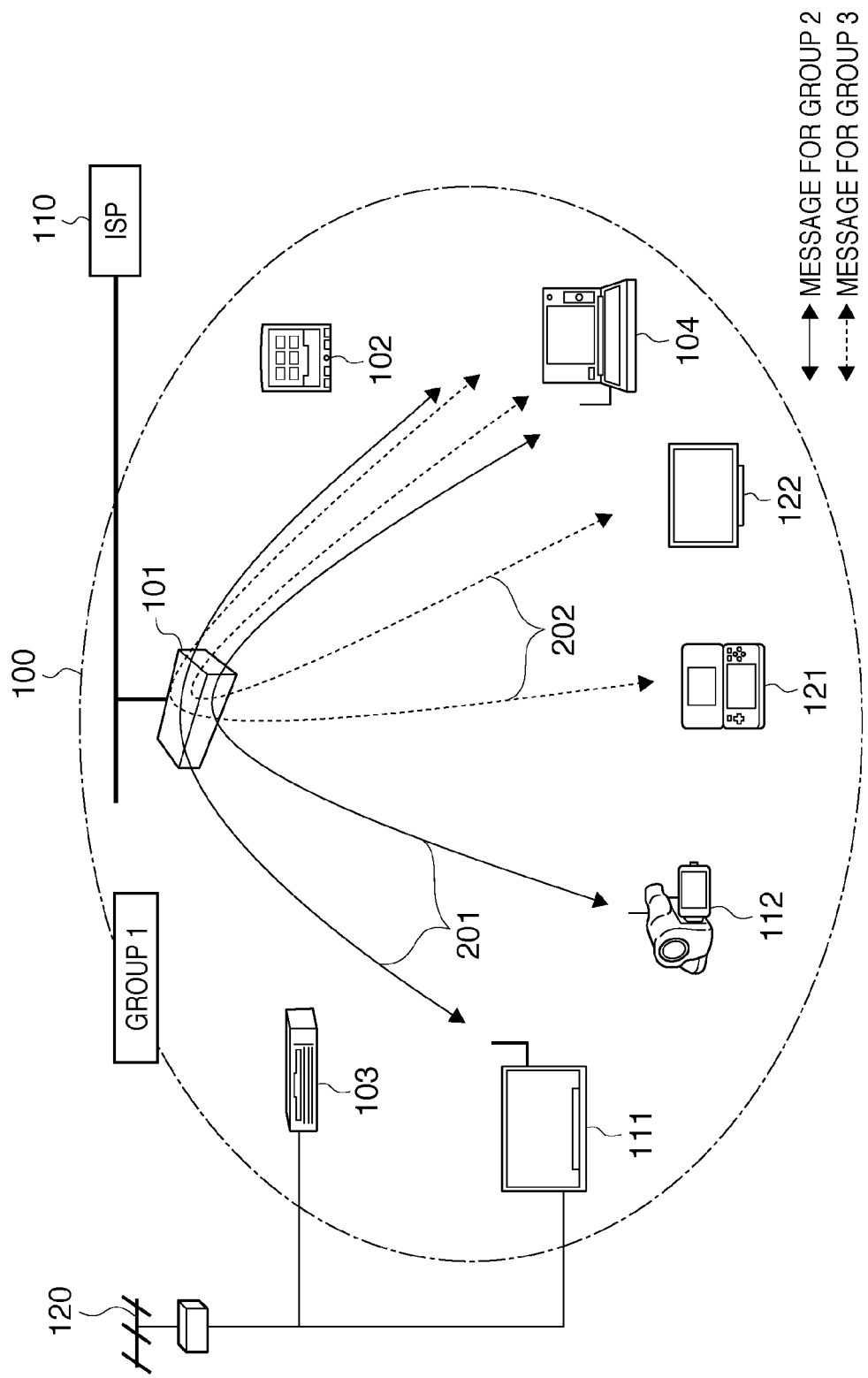
FIG. 2 is a view showing the flow of messages transmitted/received to/from communication apparatuses which leave network 1.

FIG. 2 is a view showing the flow of messages which the first reception means and first transmission means of the management apparatus 104 according to this embodiment receive and transmit from and to the communication apparatuses which leave network 1 when network 1 is separated, respectively.

FIG. 2 shows a case in which the display device 111, DVC 112, terminal apparatus 121, and display device 122 send requests to leave network 1.

Arrows 201 and 202 in FIG. 2 indicate the flow of messages which are transmitted/received by the management apparatus 104 and the communication apparatuses via the access point apparatus 101. In the example of FIG. 2, the display device 111 and DVC 112 leave network 1, and form another network. The terminal apparatus 121 and display device 122 also leave network 1, and form still another network.

A group to which the display device 111 and DVC 112 having left network 1 belong is referred to as group 2. A group to which the terminal apparatus 121 and display device 122 belong is referred to as group 3.

<3. Message Structure>

The detailed structures of various messages (messages transmitted/received in the communication system) including the messages 201 and 202 shown in FIG. 2 will be explained with reference to FIG. 3.

Figure 3:
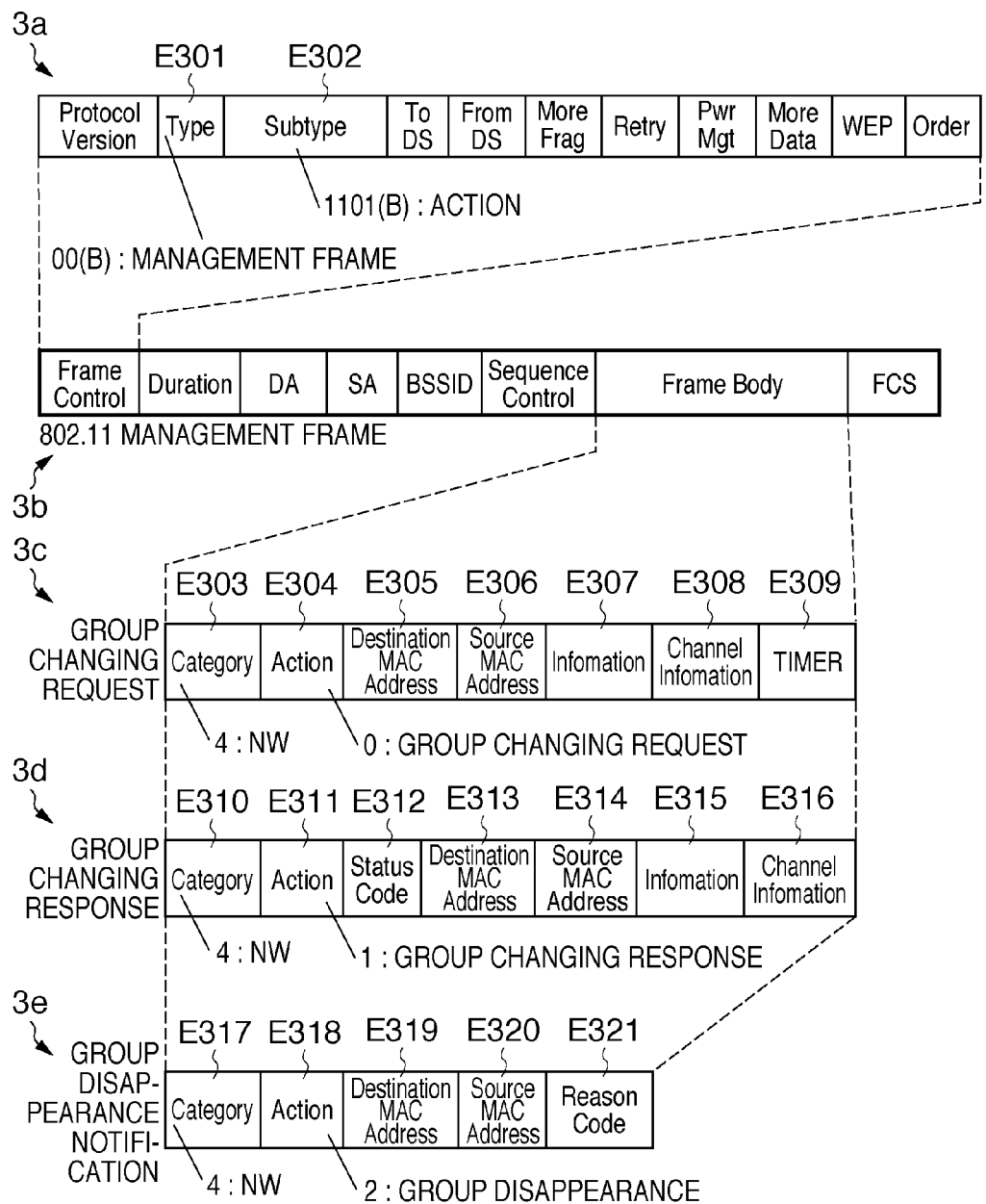
FIG. 3 is a view showing the MAC frame structures of the messages transmitted/received in the communication system.

FIG. 3 is a view showing the MAC frame structures of the messages transmitted/received in the communication system.

3b in FIG. 3 indicates the MAC frame structure as a whole. 3a in FIG. 3 indicates the structure of the frame control field of the MAC frame.

Reference symbol E301 denotes an information element indicating the type of MAC frame, in which "00" representing a management frame is stored in this example.

Reference symbol E302 denotes an information element indicating the subtype of MAC frame, in which "1101" representing ACTION is stored.

Each of 3c, 3d, and 3e in FIG. 3 indicates the structure of the frame body field of the MAC frame, and information elements in a corresponding one of a group changing request message, group changing response message, and group disappearance notification message.

To send a request to leave network 1, the group changing request message and group changing response message are used.

Reference symbols E303, E310, and E317 denote information elements each representing a message category. If the information element contains "4", the messages pertain to network separation, disappearance, and recreation.

Reference symbols E304, E311, and E318 denote information elements each representing a message class. The information element "0" indicates a group changing request message; "1", a group changing response message; and "2", a group disappearance notification message.

Reference symbols E305, E313, and E319 denote information elements each representing the MAC address of a communication apparatus as the transmission destination of the corresponding message; and E306, E314, and E320, information elements each representing the MAC address of a communication apparatus as the transmission source.

Figure 4:
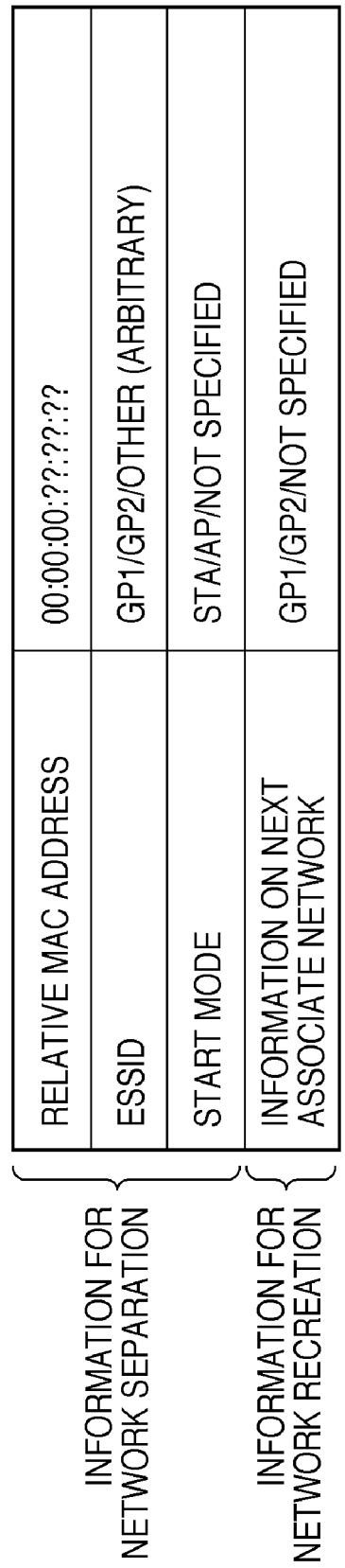
FIG. 4 is a table showing the details of group changing information.

Reference symbols E307 and E315 denote information elements each representing group changing information. As shown in FIG. 4 in detail, the group changing information contains information for network separation and that for network recreation. More specifically, the group changing information contains a "relative MAC address", an "ESSID", a "start mode", and "information on a next associate network".

Among those pieces of information, the management apparatus 104 stores the "ESSID", "start mode", "information on a next associate network" in advance, and sets them.

The "ESSID" stores the identifier of a network which is newly formed by a group to which communication apparatuses having left another network belong. The "start mode" stores information on whether the communication apparatus operates in an AP mode or STA mode when newly forming the network. The "information on a next associate network" stores a network identifier (ESSID) to be used by communication apparatuses, which have formed a disappeared network, for detecting a next associate network.

Referring back to FIG. 3, reference symbols E308 and E316 denote information elements each representing channel information used in group changing processing executed in network separation, disappearance, or recreation; and E309, an information element representing a timeout value used for setting the latency of a group changing response message.

A communication apparatus which has transmitted a group changing request message in which the information element E309 is set to "0" does not wait for receiving a group changing response message. The communication apparatus which has transmitted the group changing request message refers to the group changing information E307 and channel information E308 to form a new network (the second network).

Reference symbol E312 denotes an information element representing the status code of the group changing response message, in which information indicating whether it is possible to change a group is stored.

Reference symbol E321 denotes an information element representing a group disappearance reason, in which information indicating that a network has been recreated and direct communication has successfully ended is stored.

<4. Processing Sequence of Communication System as a Whole when Network is Separated>

Figure 5:
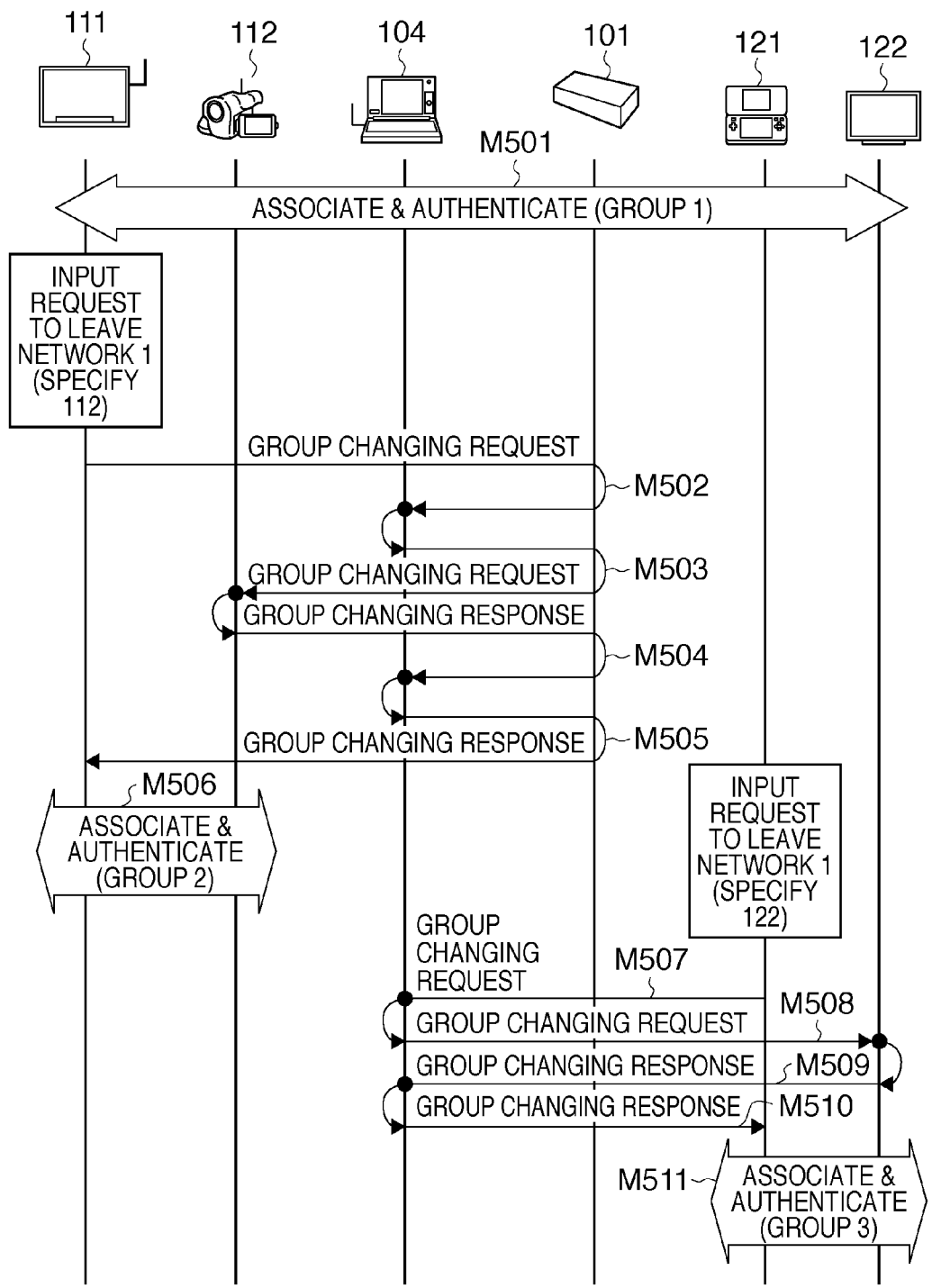
FIG. 5 is a sequence chart showing the processing sequence of the communication system as a whole when a network is separated.

FIG. 5 is a sequence chart showing the processing sequence of the communication system as a whole when a network is separated.

First, assume that in the communication system, the management apparatus 104, display device 111, DVC 112, terminal apparatus 121, and display device 122 are associated with the access point apparatus 101 (M501).

In this state, when the DVC 112 is specified and a request to leave the network 1 is sent by the user operation of the display screen of the display device 111, transmission and reception of the message 201 pertaining to the network separation start.

To leave network 1 and form a new network with the DVC 112, the display device 111 transmits a group changing request message (M502) to the management apparatus 104.

In this case, the MAC address of the management apparatus 104 is set in the information element E305 of the group changing request message (M502). The MAC address of the DVC 112 which will form the new network is set in the relative MAC address of the information element E307.

The management apparatus 104 analyzes the information element E307 of the received group changing request message (M502), and checks the communication destination (DVC 112).

The management apparatus 104 then sets an ESSID, a start mode, and information on a next associate network in the group changing information E307 of a group changing request message to be transmitted to the DVC 112.

In this case, the ESSID, start mode, and information on a next associate network are set to "GP2/STA/GP1", respectively.

"GP2" represents that the ESSID of the network to be newly formed is GP2. "STA" represents that the DVC 112 is requested to start in the STA mode.

Furthermore, "GP1" represents that the DVC 112 is requested to reconnect to a network having the ESSID="GP1" after the new network disappears.

Upon completion of setting the group changing information E307 as described above, the management apparatus 104 transmits the group changing request message (M503) containing the group changing information E307 to the DVC 112.

In this case, the MAC address of the DVC 112 is set in the transmission destination MAC address E305 of the group changing request message (M503).

The MAC address of the display device 111 which will form the new network is set in the relative MAC address of the group changing information E307.

Upon reception of the group changing request message (M503), the DVC 112 analyzes the group changing information E307 within the message, and checks the communication destination (display device 111).

The DVC 112 determines whether it is possible to form the new network with the display device 111.

If the DVC 112 determines that it is possible to form the new network, it stores the group changing information E307 within the message in the storage area of itself, and returns a group changing response message (M504) to the management apparatus 104.

In this case, the DVC 112 sets information representing that it is possible to change a group in the status code E312 of the group changing response message (M504). The DVC 112 also copies the relative MAC address of the group changing information E307 of the received group changing request message (M503) to the group changing information E315 of the group changing response message intact.

Upon completion of setting the group changing response message as explained above, the DVC 112 transmits the group changing response message (M505) to the management apparatus 104.

The DVC 112 then refers to the group changing information E307 stored in the storage area and the channel information E308, and starts in the STA mode.

The management apparatus 104 which has received the group changing response message (M505) analyzes the group changing information E315, and checks the communication destination (display device 111).

The management apparatus 104 sets an ESSID, a start mode, information on a next associate network in the group changing information E315 of a group changing response message to be transmitted to the display device 111.

In this case, assume that the ESSID, start mode, and information on a next associate network are set to "GP2/AP/GP1", respectively.

"GP2" represents that the ESSID of the network to be newly formed is GP2. "AP" represents that the display device 111 is requested to start in the AP mode.

Furthermore, "GP1" represents that the display device 111 is requested to reconnect to a network having the ESSID="GP1" in the STA mode after the new network disappears.

Upon completion of setting the group changing information E315 as described above, the management apparatus 104 transmits the group changing response message (M505) containing the group changing information E315 to the display device 111.

The display device 111 which has received the group changing response message (M505) stores the group changing information E315 within the message in the storage area of itself.

The display device 111 refers to the group changing information E315 stored in the storage area and the channel information E316, and starts in the AP mode.

The display device 111 which has started in the AP mode executes associate and authentication (M506) with the DVC 112 which is active in the STA mode.

After that, the display device 111 and DVC 112 form the new network (to be referred to as network 2).

Processing executed when the user operates the terminal apparatus 121 to leave network 1 and form a new network will be described next.

If the user specifies the display device 122, and sends a request to leave network 1 by operating the display screen of the terminal apparatus 121, transmission and reception of the message 202 pertaining to the network separation start.

To leave network 1 and form a new network with the display device 122, the terminal apparatus 121 transmits a group changing request message (M507) to the management apparatus 104.

In this case, the MAC address of the management apparatus 104 is set in the transmission destination MAC address E305 of the group changing request message (M507). The MAC address of the display device 122 which will form the new network is set in the relative MAC address of the group changing information E307.

The management apparatus 104 analyzes the group changing information E307 of the received group changing request message (M507), and checks the communication destination (display device 122).

The management apparatus 104 then sets an ESSID, a start mode, and information on a next associate network in the group changing information E307 of a group changing request message to be transmitted to the display device 122.

In this case, the ESSID, start mode, and information on a next associate network are set to "GP3/AP/GP1, GP2", respectively.

"GP3" represents that the ESSID of the network to be newly formed is GP3. "AP" represents that the display device 122 is requested to start in the AP mode.

Furthermore, "GP1, GP2" represents that the display device 122 is requested to reconnect to a network having the ESSID="GP1" or "GP2" after the new network disappears.

Upon completion of setting the group changing information E307 as described above, the management apparatus 104 transmits the group changing request message (M508) containing the group changing information E307 to the display device 122.

At this time, the MAC address of the display device 122 is set in the transmission destination MAC address E305 of the group changing request message (M508).

The MAC address of the terminal apparatus 121 which will form the new network is set in the relative MAC address of the group changing information E307.

Upon reception of the group changing request message (M508), the display device 122 analyzes the group changing information E307 within the message, and checks the communication destination (terminal apparatus 121).

The display device 122 determines whether it is possible to form the new network with the terminal apparatus 121.

If the display device 122 determines that it is possible to form the new network, it stores the group changing information E307 and channel information E308 within the message in the storage area of itself. The display device 122 returns a group changing response message (M509) to the management apparatus 104.

In this case, information representing that it is possible to change a group is set in the status code E312 of the group changing response message (M509). The display device 122 also copies the relative MAC address of the group changing information E307 of the received group changing request message (M508) to the group changing information E315 of the group changing response message intact.

Upon completion of setting the group changing response message as explained above, the display device 122 transmits the group changing response message (M509) to the management apparatus 104.

The display device 122 then refers to the group changing information E307 and channel information E308 stored in the storage area, and starts in the AP mode.

The management apparatus 104 which has received the group changing response message (M509) analyzes the group changing information E315, and checks the communication destination (terminal apparatus 121).

The management apparatus 104 sets an ESSID, a start mode, information on a next associate network in the group changing information E315 of a group changing response message to be transmitted to the terminal apparatus 121.

In this case, assume that the ESSID, start mode, and information on a next associate network are set to "GP3/STA/GP1, GP2", respectively.

"GP3" represents that the ESSID of the network to be newly formed is GP3. "STA" represents that the terminal apparatus 121 is requested to start in the STA mode.

Furthermore, "GP1, GP2" represents that the terminal apparatus 121 is requested to reconnect to a network having the ESSID="GP1" or "GP2" after the new network disappears.

Upon completion of setting the group changing information E315 as described above, the management apparatus 104 transmits the group changing response message (M510) containing the group changing information E315 to the terminal apparatus 121.

The terminal apparatus 121 which has received the group changing response message (M510) stores the group changing information E315 within the message in the storage area of itself.

The terminal apparatus 121 refers to the group changing information E315 stored in the storage area and the channel information E316, and starts in the STA mode.

The terminal apparatus 121 which has started in the STA mode executes associate and authentication (M511) with the display device 122 which is active in the AP mode.

After that, the terminal apparatus 121 and display device 122 form the new network (to be referred to as network 3).

Figure 6:
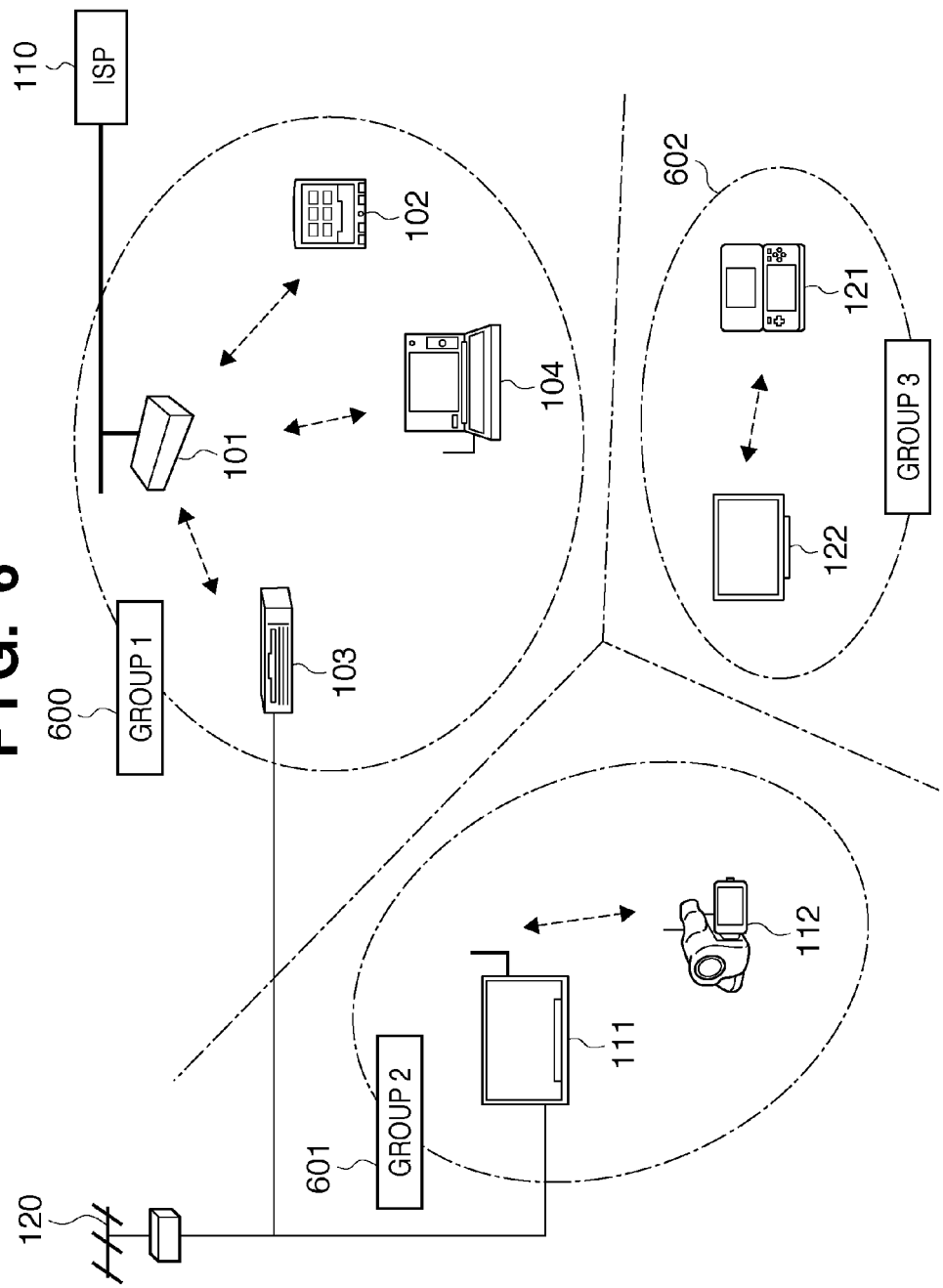
FIG. 6 is a view showing a case in which network 1 has been separated into networks 1 to 3.

With the above processing, network 1 shown in FIG. 1 is separated to obtain a network configuration shown in FIG. 6. FIG. 6 shows a case in which network 1 has been separated into networks 1 to 3 as a result of the processing shown in FIG. 5.

As shown in FIG. 6, the communication apparatuses (101, 111, and 122) which respectively have the AP function and form networks 1 to 3 have control areas 600 to 602, respectively.

In each control area, a different BSS (Basic Service Set) is created by using a different channel, and is operated in the infrastructure mode.

As shown in FIG. 6, the access point apparatus 101, PDA apparatus 102, tuner apparatus 103, and management apparatus 104 belong to a group (group 1) forming network 1.

The display device 111 and DVC 112 belong to a group (group 2) forming network 2. The display device 122 and terminal apparatus 121 belong to a group (group 3) forming network 3.

<5. Sequence of Processing (Network Disappearance and Recreation) of Each Communication Apparatus after Network is Separated>

The processing of each communication apparatus after a network is separated will be explained next. As described above, upon completion of desired wireless communication in a newly formed network, the network disappears and each communication apparatus forming the communication system can recreate a network.

Figure 7:
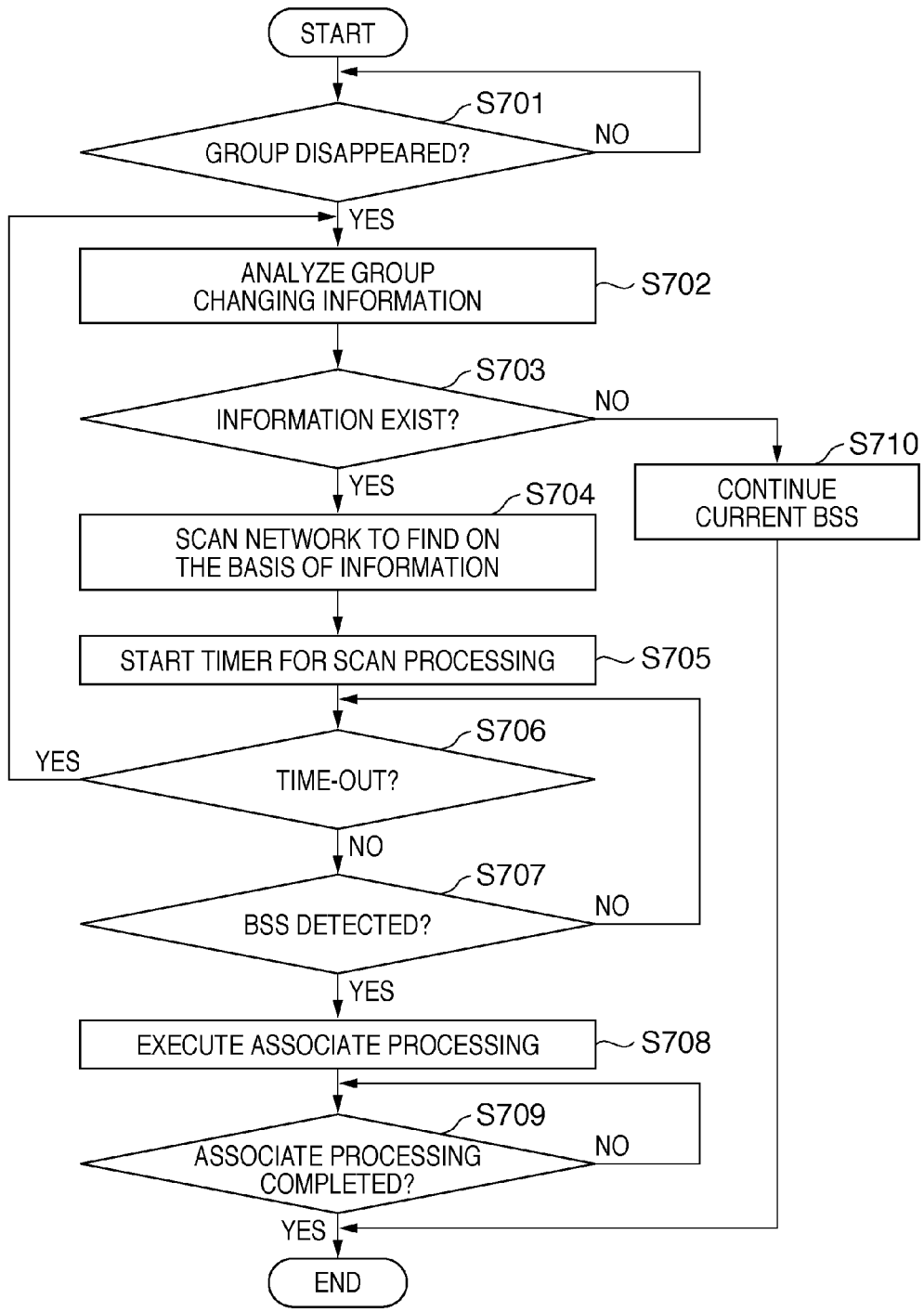
FIG. 7 is a flowchart illustrating the sequence of the processing (network disappearance and recreation) of each communication apparatus after a network is separated.

FIG. 7 is a flowchart illustrating the sequence of the processing (network disappearance and recreation) of each communication apparatus after a network is separated. The processing of each communication apparatus when a next associate network is detected and that of each communication apparatus when a next associate network is not detected will be separately described below with reference to FIG. 7.

5.1. Processing when Next Associate Network is Detected

Referring to FIG. 6, disappearance conditions for network 3 formed by group 3 to which the terminal apparatus 121 and display device 122 belong are as follows.

(A) The terminal apparatus 121 leaves network 3, or sends a request to leave network 3.

(B) The display device 122 halts the AP function, or sends a request to halt the AP function.

Upon detecting the above disappearance condition (A) (YES in step S701), the display device 122 analyzes the group changing information E307 stored in its storage area (step S702).

The "information on a next associate network" stored in the storage area of the display device 122 is "GP1" or "GP2".

The processing when the apparatuses reconnect to the network (network 1) having the ESSID="GP1" (when the apparatuses are associated with the access point apparatus 101 of group 1) will be explained first.

Upon determining that the information on a next associate network exists (YES in step S703), the display device 122 scans to find the network (in this case, network 1) (step S704). The display device 122 also sets a timer for the scan processing (step S705).

Assume that the display device 122 detects the network (network 1) (YES in step S707) before the timer expires (NO in step S706). In this case, the process advances to step S708. In step S708, the display device 122 executes associate processing with the communication apparatus (in this case, the access point apparatus 101) which belongs to the group forming the network.

Upon completion of the associate processing (YES in step S709), the display device 122 belongs to group 1, and network 1 is recreated.

Note that if the terminal apparatus 121 detects the above disappearance condition (B), the processes of the steps S701 to S709 are similarly performed. As a result, the terminal apparatus 121 and display device 122 belong to group 1, and network 1 is recreated.

Figure 8:
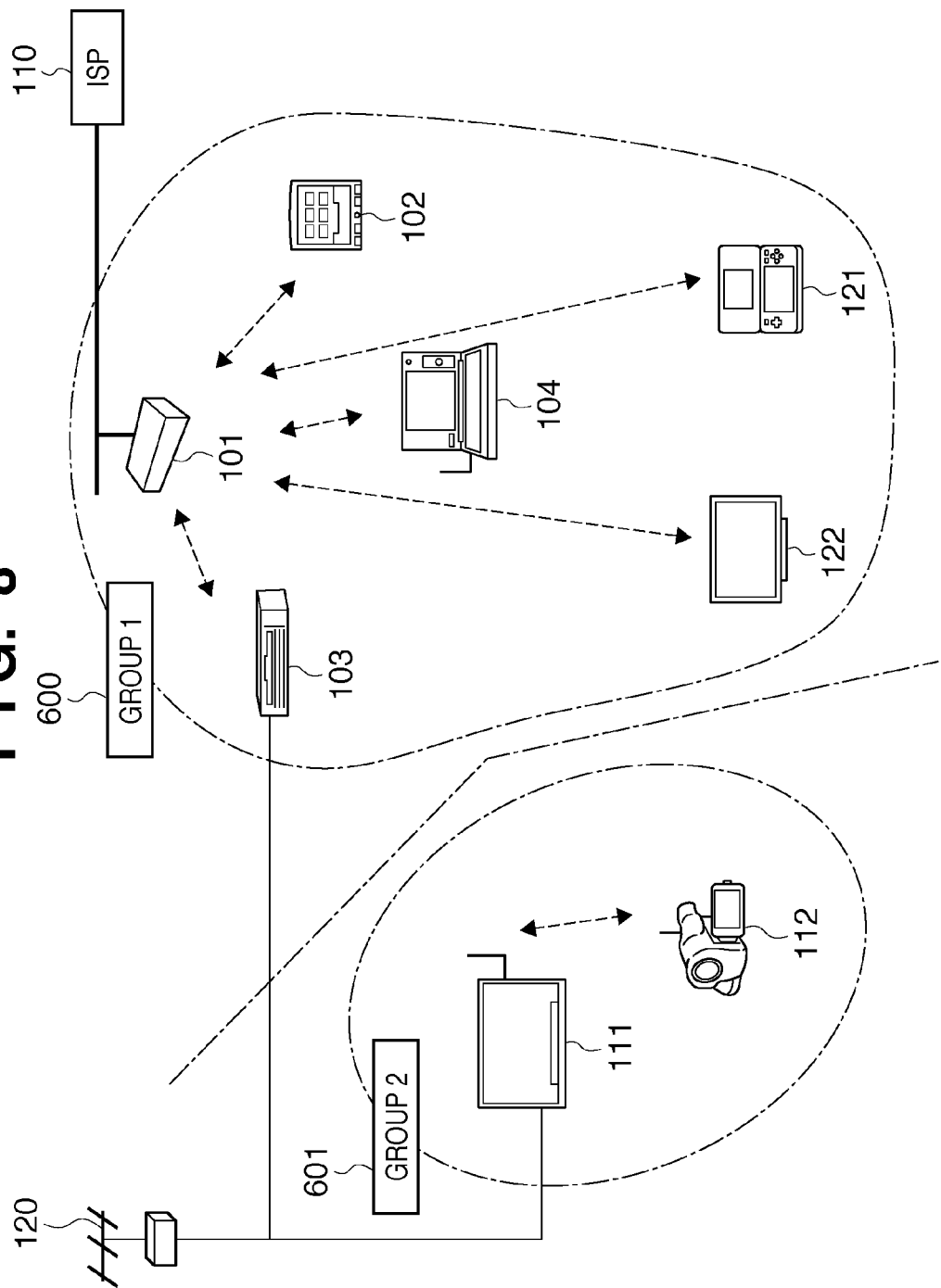
FIG. 8 is a view showing a case in which network 3 has disappeared and network 1 has been recreated.

FIG. 8 is a view showing a case in which network 3 has disappeared and network 1 has been recreated, as a result of the processing shown in FIG. 7.

5.2. Processing when Next Associate Network is not Detected

Processing when the display device 122 and terminal apparatus 121 cannot detect a next associate network will be described next. Note that the cases in which it is impossible to detect a next associate network include a state shown in FIG. 9.

Figure 9:
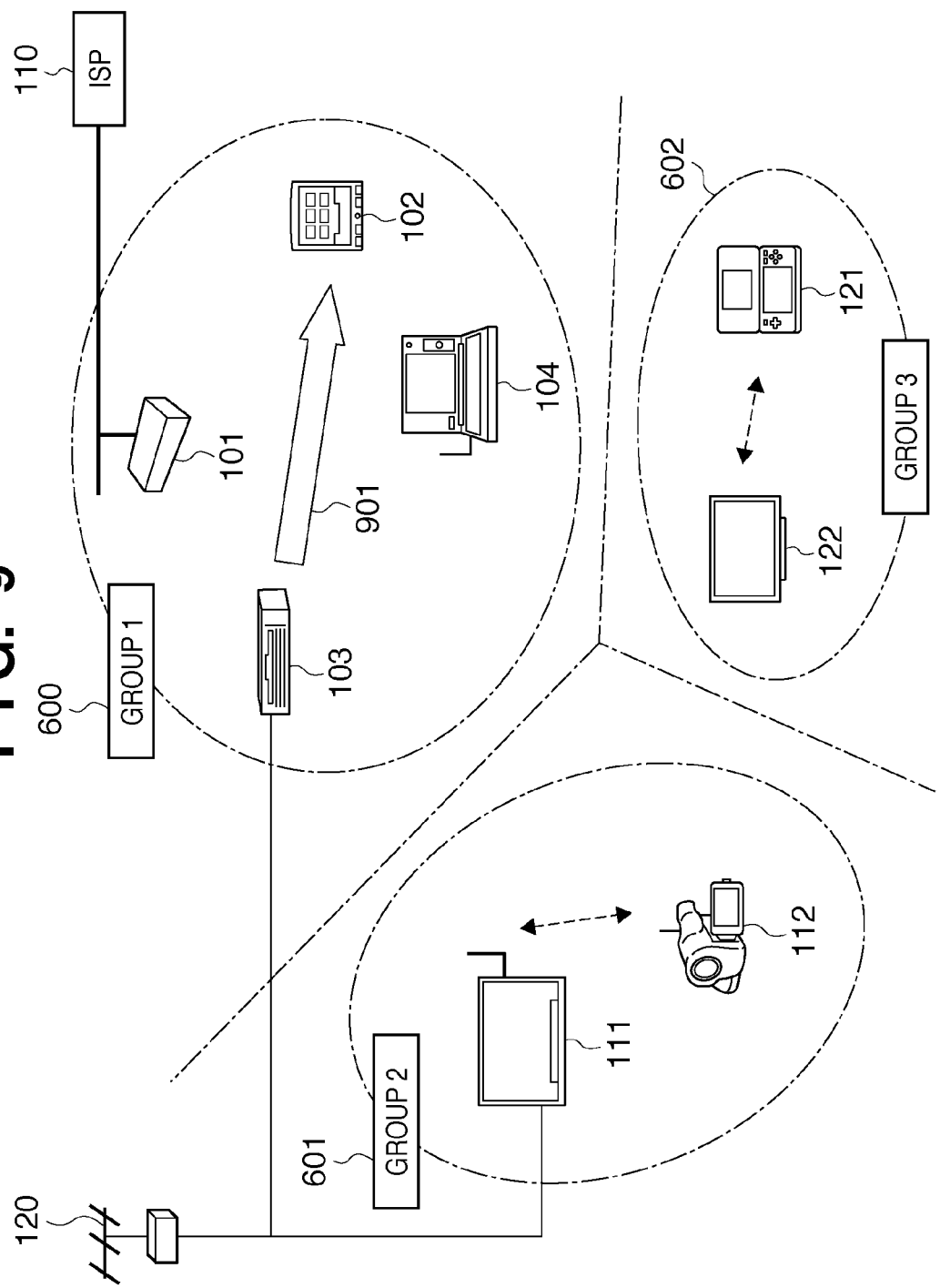
FIG. 9 is a view showing a case in which network 1 has been separated into networks 1 to 3 and wireless communication is executed in each network.

FIG. 9 is a view showing a case in which network 1 has been separated into networks 1 to 3 and wireless communication is executed in each network.

Assume that in the control area 600, most of the band available within network 1 is being used by moving image data 901 which is transmitted from the tuner apparatus 103 to the PDA apparatus 102.

In this state, the management apparatus 104 instructs the access point apparatus 101 to transit to a stealth mode in consideration of the communication resource management of the wireless communication.

The stealth mode is a mode for hiding the ESSID of the control area 600 to avoid being readily accessed from any communication apparatuses. In this mode, the display device 122 and terminal apparatus 121 cannot detect network 1 as a next associate network. The processing of each communication apparatus in this state will be explained below in accordance with FIG. 7.

Upon detecting that the terminal apparatus 121 leaves network 3 (YES in step S701), the display device 122 analyzes the stored group changing information E307 (step S702).

The "information on a next associate network" stored in the storage areas of the terminal apparatus 121 and display device 122 are "GP1" and "GP2", respectively.

Upon determining that the information on a next associate network exists (YES in step S703), the display device 122 scans to find the network (in this case, network 1) (step S704). The display device 122 then sets a timer for the scan processing (step S705).

Assume that the display device 122 cannot detect the network (network 1) (NO in step S707) before the timer expires (YES in step S706). In this case, the display device 122 analyzes the group changing information E307 (step S702).

As described above, since the access point apparatus 101 is in the stealth mode, it is impossible to detect network 1 and the display device 122 analyzes the group changing information E307.

As a result of analyzing the group changing information E307, if the display device 122 determines that the information on a next associate network exists (YES in step S703), it scans to find the network (in this case, network 2) (step S704). The display device 122 then sets a timer for the scan processing (step S705).

Assume that the display device 122 detects the network (network 2) (YES in step S707) before the timer expires (NO in step S706). In this case, the process advances to step S708. In step S708, the display device 122 executes associate processing with the communication apparatus (in this case, the display device 111) which belongs to the group forming the network.

Upon completion of the associate processing (YES in step S709), the display device 122 belongs to group 2, and network 2 is recreated.

Figure 10:
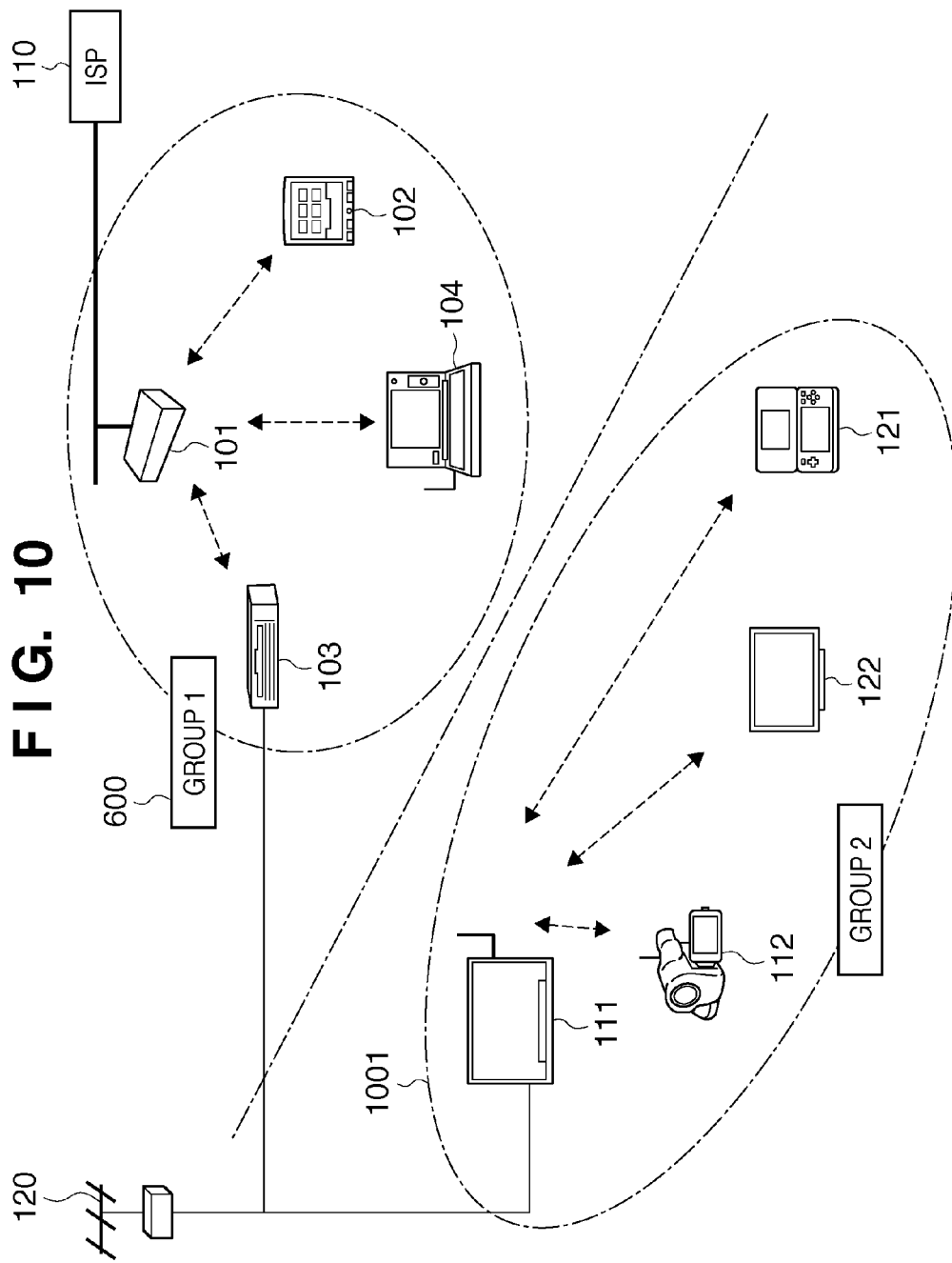
FIG. 10 is a view showing a case in which network 3 has disappeared and network 2 has been recreated.

FIG. 10 is a view showing a case in which network 3 has disappeared and network 2 has been recreated, as a result of the processing shown in FIG. 7.

If both of the networks having the ESSIDs stored in the information on a next associate network cannot be detected (NO in step S703), the display device 122 starts in the AP mode again. The terminal apparatus 121 starts in the STA mode again. Consequently, network 3 is formed (step S710).

If the terminal apparatus 121 detects the above disappearance condition (B), the processes of the steps S701 to S709 are similarly performed. As a result, the terminal apparatus 121 and display device 122 belong to group 2, network 2 is recreated.

<6. Group Management Table>

FIG. 11 is a table showing the details of a group management table stored in the storage area of the management apparatus 104. FIG. 11 shows the group management table after network 1 is separated.

As is apparent from the above description, in this embodiment, the management apparatus 104 is arranged in the communication system, and notifies the communication apparatuses of the communication resources for separation and those for recreation when a network is separated. With this arrangement, the communication apparatuses which have left the network to form a new network form a network on the basis of the communication resource information. The management apparatus can, therefore, manage the communication resources of the networks.

Even if the newly formed network disappears and the network is recreated, it is possible to manage the communication resources after the recreation.

Second Embodiment

In the above first embodiment, the communication resources of the communication apparatuses are managed by setting the communication resources for separation and those for recreation in the communication apparatuses when the network is separated. The present invention, however, is not limited to this. The management apparatus may notify the communication apparatuses of the communication resources for separation when the network is separated, and notify the communication apparatuses of the communication resources for recreation when the network disappears.

In the above first embodiment, the configuration in which the groups after the network is separated are managed has been explained. The present invention, however, is not limited to this. The groups, for example, after the separated network disappears and the network is recreated may also be managed.

The second embodiment will be described in detail below. Note that the processing until the network is separated is the same as in the above first embodiment, and a description thereof will be omitted. The processing of network disappearance and recreation will be explained below.

<1. Flow of Messages Transmitted/Received in Network Disappearance and Recreation>

Figure 12:
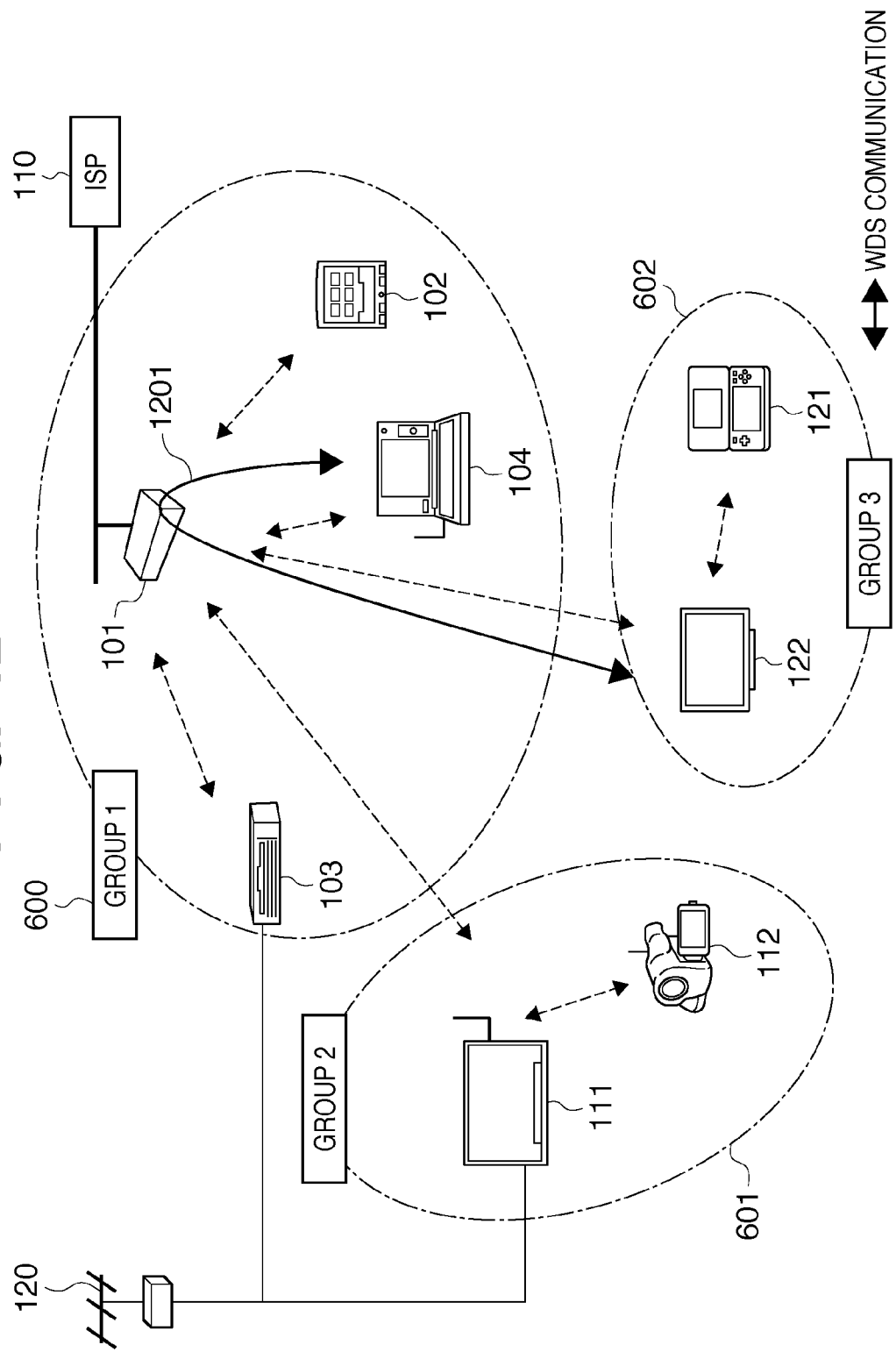
FIG. 12 is a view showing the flow of messages which a management apparatus 104 transmits/receives to/from a communication apparatus notifying that network 3 has disappeared.

FIG. 12 is a view showing the flow of messages which the second reception means and the second transmission means of a management apparatus 104 according to this embodiment respectively use a WDS (Wireless Distribution System) function to receive and transmit from and to a display device 122 notifying the apparatus 104 of the disappearance of network 3.

The management apparatus 104 and display device 122 use the WDS to transmit/receive a message 1201 to/from each other.

Figure 13:
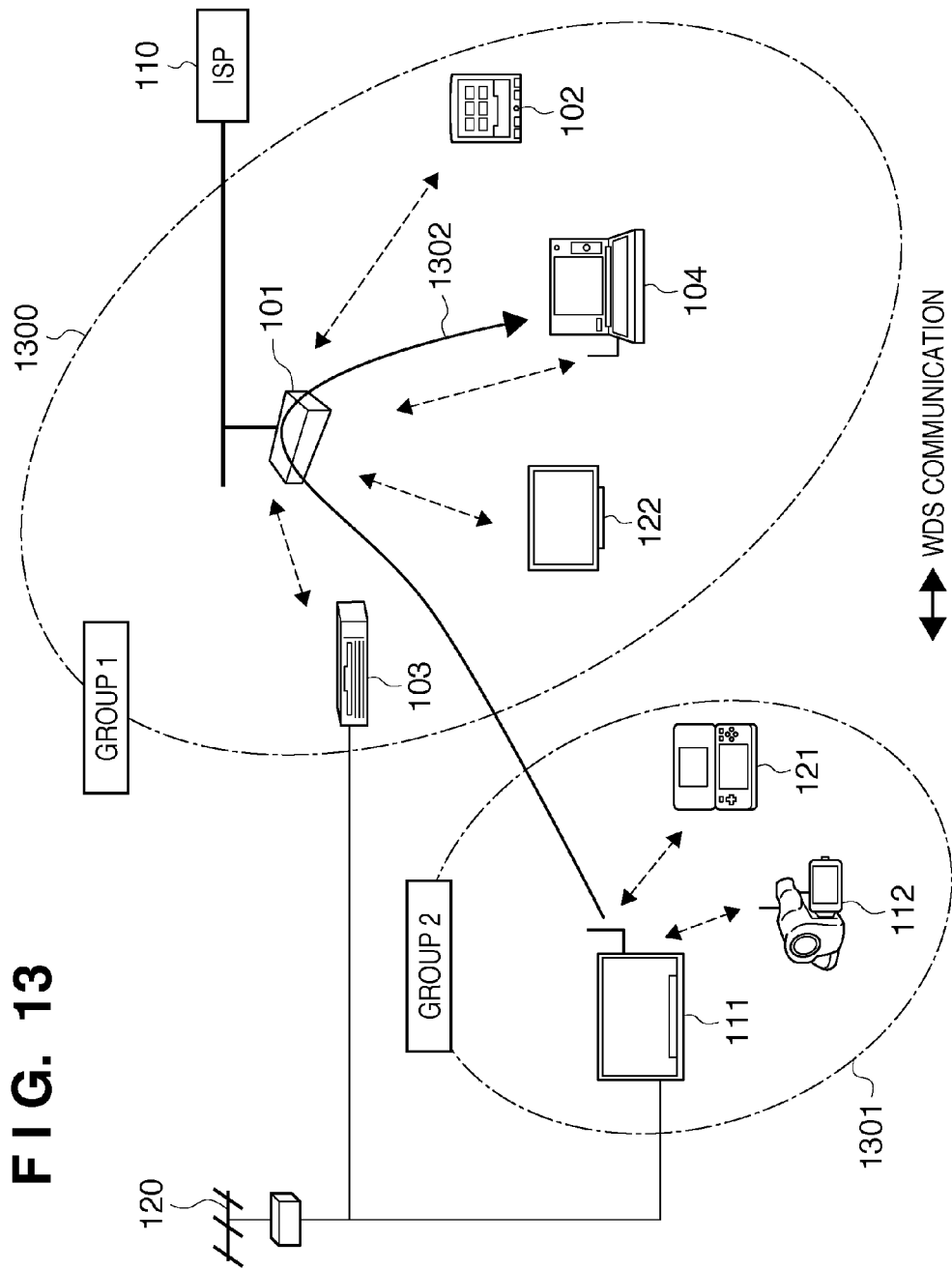
FIG. 13 is a view showing the flow of messages which the management apparatus 104 transmits/receives to/from a display device 111 after network 3 disappears and networks 1 and 2 are recreated.

FIG. 13 is a view showing the flow of messages which the second reception means and the second transmission means of the management apparatus 104 according to this embodiment respectively use the WDS function to receive and transmit from and to a display device 111 after networks 1 and 2 are recreated.

The management apparatus 104 and display device 111 use the WDS to transmit/receive a message 1302 to/from each other.

<2. Processing Sequence of Communication System as a Whole in Network Disappearance and Recreation>

Figure 14:
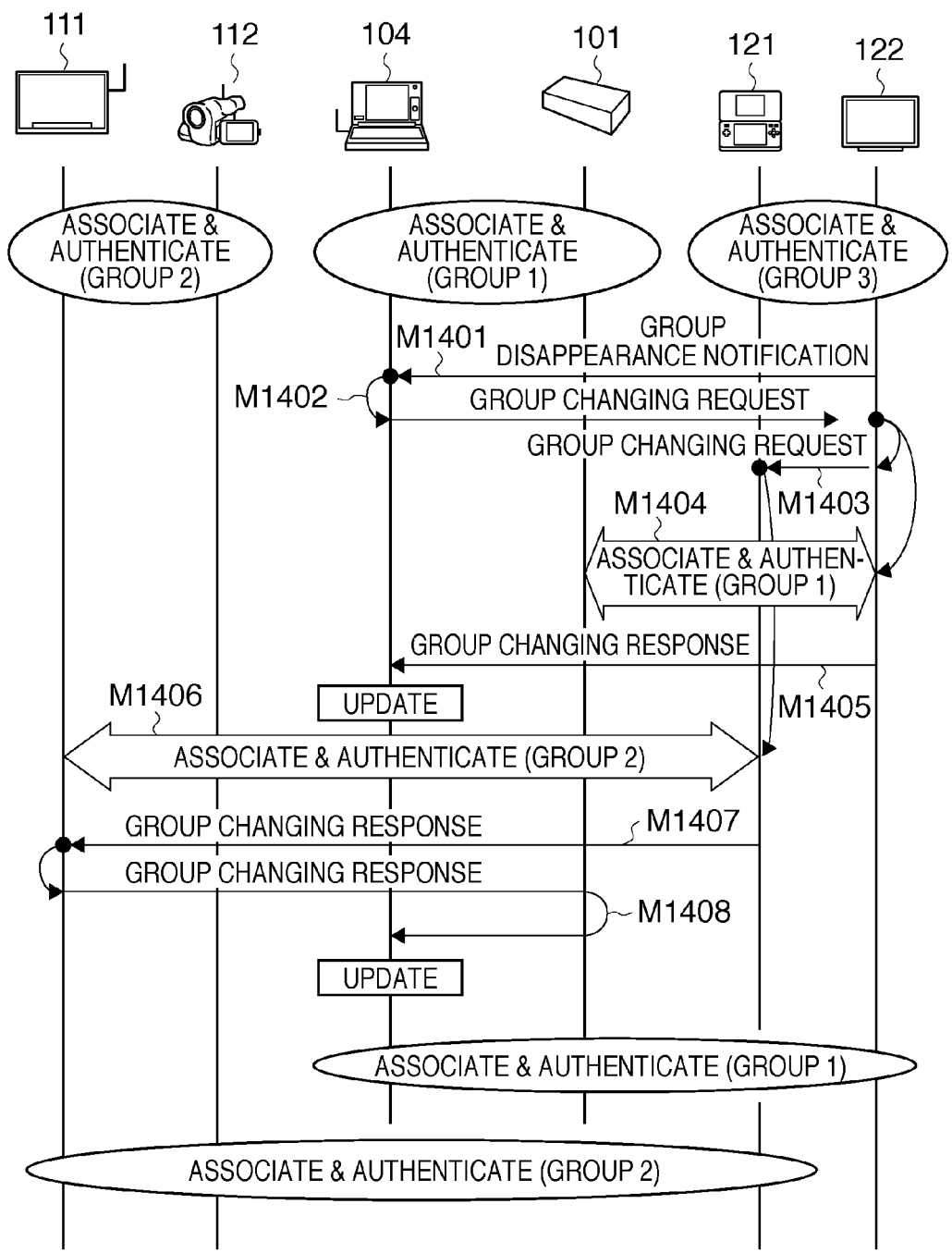
FIG. 14 is a sequence chart showing the processing sequence of a communication system as a whole.

FIG. 14 is a sequence chart showing the processing sequence of the communication system as a whole when network 3 formed by a terminal apparatus 121 and display device 122 disappears, and networks 1 and 2 are recreated.

Figure 15:
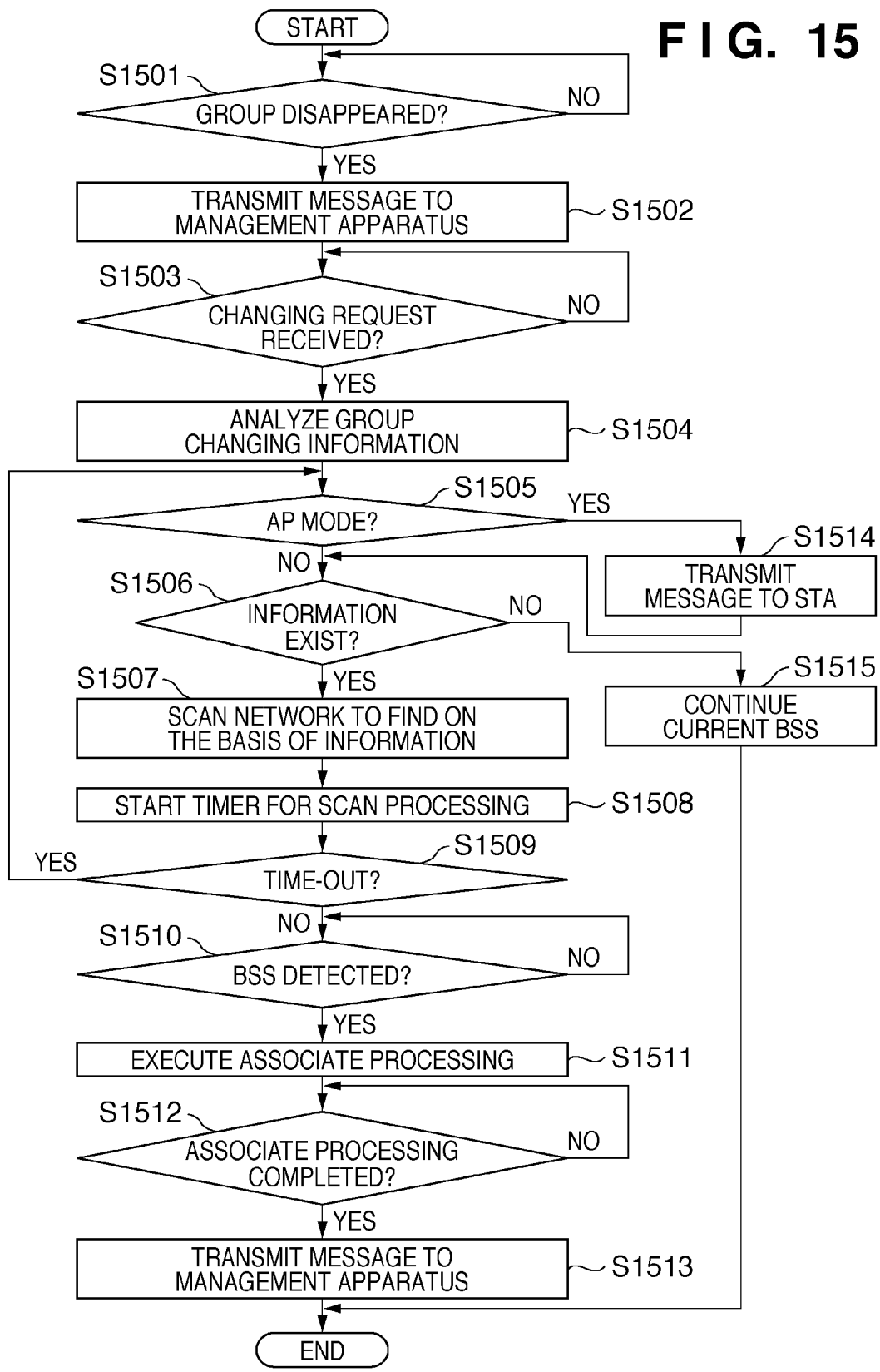
FIG. 15 is a flowchart illustrating the processing sequence between a terminal apparatus 121 and a display device 122.

FIG. 15 is a flowchart illustrating the processing sequence between the terminal apparatus 121 and the display device 122 in this case.

The processing sequence of the communication system as a whole when network 3 disappears and networks 1 and 2 are recreated will be explained below with reference to FIGS. 14 and 15.

Disappearance conditions for network 3 formed by the terminal apparatus 121 and display device 122 are as follows, similarly to the first embodiment.

(A) The terminal apparatus 121 leaves the network 3, or sends a request to leave network 3.

(B) The display device 122 halts the AP function, or sends a request to halt the AP function.

Upon detecting the above disappearance condition (A) (YES in step S1501), the display device 122 uses the WDS to transmit a group disappearance notification message (M1401) to the management apparatus 104 (step S1502).

In this case, the MAC address of the management apparatus 104 is set in a transmission destination MAC address E319. The MAC address of the display device 122 is set in a transmission source MAC address E320.

The management apparatus 104 which has received the group disappearance notification message (M1401) examines a group disappearance reason E321 of the message (M1401), and checks if the processing has ended normally.

The management apparatus 104 then analyzes the transmission source MAC address E320 of the message (M1401), and checks that the transmission source is the display device 122.

At the same time, the management apparatus 104 refers to a group management table (FIG. 11), and recognizes the presence of the terminal apparatus 121 which has been associated with the display device 122.

The management apparatus 104 sets a start mode and information on a next associate network in a group changing information E307 of a group changing request message to be transmitted to the display device 122.

In this case, assume that the management apparatus 104 sets the start mode and the information on a next associate network to "STA/GP1" and "STA/GP2", respectively.

The start mode="STA" indicates that the display device 122 and terminal apparatus 121 are requested to start in the STA mode.

The information on a next associate network="GP1" represents that the apparatus is requested to reconnect to a network (network 1) having the ESSID "GP1" after network disappearance.

Similarly, the information on a next associate network="GP2" indicates that the apparatus is requested to reconnect to a network (network 2) having the ESSID="GP2" after network disappearance.

Upon completion of setting the group changing information E307 as described above, the management apparatus 104 transmits the group changing request message (M1402) containing the group changing information to the display device 122 (step S1502).

In this case, the MAC address of the display device 122 has been set in the transmission destination MAC address E305 of the group changing request message (M1402).

Upon reception of the group changing request message (M1402) (YES in step in S1503), the display device 122 analyzes the group changing information E307 (step S1504).

As a result of the analysis, the display device 122 checks that "GP2" has been set in the information on a next associate network.

Since the current start mode of the display device 122 is the AP mode (YES in step S1505), the display device 122 transmits a group changing request message (M1403) to the terminal apparatus 121.

In this case, assume that the start mode and information on a next associate network of the group changing request message (M1403) have been set to "STA/GP2", respectively (step S1514).

With the above processing, the management apparatus 104 provides "GP1" as the information on a next associate network for the display device 122.

Furthermore, the management apparatus 104 provides "GP2" as the information on a next associate network for the terminal apparatus 121.

As a result of the analysis in step S1504, the display device 122 determines whether the information on a next associate network exists.

If the information on a next associate network is determined to exist (YES in step S1506), the display device 122 scans to find a network having the ESSID (in this case, network 1) (step S1507). The display device 122 also sets a timer for the scan processing (step S1508).

Assume that the display device 122 detects such network (network 1) (YES in step S1510) before the timer expires (NO in step S1509). In this case, the display device 122 executes associate processing (step S1511).

Upon completion of the associate processing with an access point apparatus 101 forming the network (network 1) (YES in step S1512), the display device 122 belongs to group 1.

Upon completion of the associate processing and authentication (M1404), the display device 122 transmits a group changing response message (M1405) to the management apparatus 104 (step S1513).

Upon reception of the group changing response message (M1405), the management apparatus 104 recognizes that the message is a response to the group changing request message (M1402), and updates the group management table.

On the other hand, if the display device 122 cannot detect any network having an ESSID indicated by the information on a next associate network (NO in step S1506), the display device 122 starts in the AP mode again, thereby forming network 3 (step S1515).

Similarly, if the terminal apparatus 121 determines that the information on a next associate network exists (YES in step S1506), it scans to find a network having the ESSID (in this case, network 2) (step S1507). The terminal apparatus 121 also sets a timer for the scan processing (S1508).

Assume that the terminal apparatus 121 detects the network (network 2) (YES in step S1510) before the timer expires (NO in step S1509). In this case, the terminal apparatus 121 executes associate processing (step S1511).

Upon completion of the associate processing with the display device 111 forming the network (network 2) (YES in step S1512), the terminal apparatus 121 belongs to group 2.

Upon completion of the associate processing and authentication (M1406), the terminal apparatus 121 transmits a group changing response message (M1407) to the management apparatus 104 (step S1513).

In this case, the MAC address of the management apparatus 104 has been set in the transmission destination MAC address E314 of the message (M1407). The MAC address of the terminal apparatus 121 has been set in the transmission source MAC address E313.

The display device 111 which has received the group changing response message (M1407) uses the WDS to transmit this message (M1408) to the management apparatus 104 via the access point apparatus 101 forming network 1.

Upon reception of the message (M1408), the management apparatus 104 recognizes that the message is a response to the group changing request message (M1402), and updates the group management table.

If the terminal apparatus 121 cannot detect any network having an ESSID indicated by the information on a next associate network (NO in step S1506), it starts in the STA mode again, thereby forming network 3 (step S1515).

<4. Group Management Table>

FIG. 16 is a table showing the details of the group management table stored in the storage area of the management apparatus 104. FIG. 16 shows the group management table after network 3 disappears and networks 1 and 2 are recreated.

As is apparent from the above explanation, in this embodiment, when a network disappears, the management apparatus arranged within the communication system uses the WDS to communicate with the communication apparatuses, thereby notifying them of the communication resources for recreation.

With this arrangement, even if a network disappears and another network is recreated, the management apparatus can manage the communication resources of each network.

In this embodiment, when a network is recreated, the management apparatus arranged within the communication system uses the WDS to communicate with the communication apparatuses, thereby managing the groups each forming a network.

With this arrangement, even if a network disappears and another network is recreated, the management apparatus can manage the groups each forming a network.

Third Embodiment

In the above first and second embodiments, if it is impossible to detect any network having an ESSID indicated by the information on a next associate network, the terminal apparatus starts in the previous mode, and continues to form the former network.

The present invention, however, is not limited to this. For example, an associable network may be periodically searched for in accordance with the priority of the specified network. If such network is detected, a communication apparatus may leave the current network, and associate with the specified network.

Other Embodiments

The present invention may be applied to a system including a plurality of devices (e.g., a host computer, interface device, reader, and printer) or an apparatus (e.g., a copying machine, or facsimile apparatus) formed by a single device.

The object of the present invention is also achieved when a computer-readable recording medium which records software program codes for implementing the functions of the above-described embodiments is supplied to a system or apparatus. The above functions are implemented when the computer (or the CPU or MPU) of the system or apparatus reads out and executes the program codes stored in the recording medium. In this case, the recording medium which records the program codes constitutes the present invention.

The recording medium for supplying the program codes includes a Floppy® disk, hard disk, optical disk, magnetooptical disk, CD-ROM, CD-R, magnetic tape, nonvolatile memory card, and ROM.

The present invention is not limited to a case in which the functions of the above-described embodiments are implemented when the computer executes the readout program codes. Also, the present invention includes a case in which the functions of the above-described embodiments are implemented when an OS (Operating System) or the like running on the computer performs some or all of actual processes on the basis of the instructions of the program codes.

Furthermore, the present invention includes a case in which, after the program codes read out from the recording medium are written in the memory of a function expansion board inserted into the computer or the memory of a function expansion unit connected to the computer, the functions of the above-described embodiments are implemented. That is, the present invention includes a case in which, after the program codes are written in the memory, the CPU of the function expansion board or function expansion unit performs some or all of actual processes on the basis of the instructions of the program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-084099, filed Mar. 27, 2008, which is hereby incorporated by reference herein in its entirety.

The invention claimed is:

1. An information processing apparatus comprising:
a first reception unit configured to receive a message indicating formation of a second network from a first subset of communication apparatuses leaving a first network;
a management unit configured to manage information for the second network and information for a third network, wherein the third network is a network to be connected by the first subset of communication apparatuses in response to the second network disappearing; and
a first transmission unit configured to transmit, when the message is received by said first reception unit, at least the information for the second network or the information for the third network to the first subset of communication apparatuses.

2. The apparatus according to claim 1, further comprising a storage unit configured to store information on a communication apparatus forming the second network, and information on a communication apparatus forming the first network after the second network is formed.

3. The apparatus according to claim 1, further comprising a second transmission unit configured to transmit, when the first subset of communication apparatuses which had formed the second network notify that the second network has disappeared, the information for joining the third network to the first subset of communication apparatuses.

4. The apparatus according to claim 3, further comprising an update unit configured to receive information on a communication apparatus forming the third network which the first subset of communication apparatuses join from the second network, and update information on a communication apparatus forming a network with the received information, in response to the message transmitted by said second transmission unit.

5. A control method, comprising:
a reception step of receiving a message indicating formation of a second network from a first subset of communication apparatuses leaving a first network;
a management step of managing information for the second network and information for a third network, wherein the third network is a network to be connected by the first subset of communication apparatuses in response to the second network disappearing; and
a transmission step of transmitting, when the message is received in said reception step, at least the information for the second network or the information for the third network to the first subset of communication apparatuses,
wherein said reception step, said management step and said transmission step are performed by computer processors.

6. A non-transitory computer-readable storage medium storing an executable program for causing a computer to execute a method that comprises:
a reception step of receiving a message indicating formation of a second network from a first subset of communication apparatuses leaving a first network;
a management step of managing information for the second network and information for a third network, wherein the third network is a network to be connected by the first subset of communication apparatuses in response to the second network disappearing; and
a transmission step of transmitting, when the message is received in said reception step, at least the information for the second network or the information for the third network to the first subset of communication apparatuses.

7. An information processing apparatus comprising:
a message reception unit configured to receive, when a first subset of communication apparatuses of a plurality of communication apparatuses for forming a first network topology disassociates from a first network and forms a second network topology, a message for requesting to form the second network topology from the first subset communication apparatuses;
a management unit configured to manage identification information of a second network for forming the second network topology and identification information of a third network for associating with a third network topology which is different from the second network topology in response to the second network disappearing; and
a message transmission unit configured to transmit, when said message reception unit receives the message from the first subset of communication apparatuses, the identification information of the second network or the identification information of the third network to the first subset of communication apparatuses.

8. An information processing method comprising:
a message reception step of receiving, when a first subset communication apparatuses of a plurality of communication apparatuses for forming a first network topology disassociates from a first network and forms a second network topology, a message for requesting to form the second network topology from the first subset communication apparatuses;
a management step of managing identification information of a second network for forming the second network topology and identification information of a third network for associating with a third network topology which is different from the second network topology in response to the second network disappearing, and a message transmission step of transmitting, when a message is received from the first subset of communication apparatuses in said message reception step, the identification information of the second network or the identification of the third network to the first subset of communication apparatuses.

9. A non-transitory computer-readable storage medium storing an executable program for causing a computer to perform a method, said method comprising:

a message reception step of receiving, when a first subset communication apparatuses of a plurality of communication apparatuses for forming a first network topology disassociates from a first network and forms a second network topology, a message for requesting to form the second network topology from the first subset communication apparatuses;

a management step of managing identification information of a second network for forming the second network topology and identification information of a third network for associating with a third network topology which is different from the second network topology in response to the second network disappearing, and a message transmission step of transmitting, when a message is received from the first subset of communication apparatuses in said message reception step, the identification information of the second network or the identification of the third network to the first subset of communication apparatuses.

* * * * *